Oct. 26, 1971 A. J. PETROS 3,614,881

AUTOMATIC THREADING DEVICES FOR COLD MILLS

Filed June 25, 1968 14 Sheets-Sheet 1

INVENTOR
Andrew J. Petros
BY
HIS ATTORNEYS

Oct. 26, 1971 A. J. PETROS 3,614,881

AUTOMATIC THREADING DEVICES FOR COLD MILLS

Filed June 25, 1968 14 Sheets-Sheet 2

INVENTOR
Andrew J. Petros
BY

HIS ATTORNEYS

Oct. 26, 1971 A. J. PETROS 3,614,881

AUTOMATIC THREADING DEVICES FOR COLD MILLS

Filed June 25, 1968 14 Sheets-Sheet 3

Oct. 26, 1971 A. J. PETROS 3,614,881

AUTOMATIC THREADING DEVICES FOR COLD MILLS

Filed June 25, 1968 14 Sheets-Sheet 4

INVENTOR
Andrew J. Petros
BY
Gnall, Blenko & Lauchner
HIS ATTORNEYS

INVENTOR
Andrew J. Petros
BY
Buell, Blenko & Ziesenheim
HIS ATTORNEYS

INVENTOR
Andrew J. Petros.
BY
Buell, Blenko & Ziesenheim
HIS ATTORNEYS

INVENTOR
Andrew J. Petros.
BY
Buell, Blenko & Ziesenheim
HIS ATTORNEYS

Oct. 26, 1971 A. J. PETROS 3,614,881

AUTOMATIC THREADING DEVICES FOR COLD MILLS

Filed June 25, 1968

14 Sheets-Sheet 8

INVENTOR
Andrew J. Petros.
BY
Buell, Blenko & Ziesenheim
HIS ATTORNEYS

Oct. 26, 1971 A. J. PETROS 3,614,881

AUTOMATIC THREADING DEVICES FOR COLD MILLS

Filed June 25, 1968 14 Sheets-Sheet 10

INVENTOR
Andrew J. Petros.
BY
Buell, Blenko & Ziesenheim
HIS ATTORNEYS

AUTOMATIC THREADING DEVICES FOR COLD MILLS

Filed June 25, 1968

INVENTOR
Andrew J. Petros
BY
[signature]
HIS ATTORNEYS

INVENTOR
Andrew J. Petros.
BY
Buell, Blenko & Ziesenheim
HIS ATTORNEYS

Oct. 26, 1971 A. J. PETROS 3,614,881

AUTOMATIC THREADING DEVICES FOR COLD MILLS

Filed June 25, 1968 14 Sheets-Sheet 13

INVENTOR
Andrew J. Petros
BY Buell, Blenko & Ziesenheim
HIS ATTORNEYS

Oct. 26, 1971 A. J. PETROS 3,614,881

AUTOMATIC THREADING DEVICES FOR COLD MILLS

Filed June 25, 1968 14 Sheets-Sheet 14

INVENTOR
Andrew J. Petros
BY
Buell, Blenko & Ziesenheim
HIS ATTORNEYS

United States Patent Office 3,614,881
Patented Oct. 26, 1971

3,614,881
AUTOMATIC THREADING DEVICES FOR COLD MILLS

Andrew J. Petros, Pittsburgh, Pa., assignor to Mesta Machine Company, Pittsburgh, Pa.

Filed June 25, 1968, Ser. No. 739,720
Int. Cl. B21b *37/00, 39/20, 41/00*
U.S. Cl. 72—12 9 Claims

ABSTRACT OF THE DISCLOSURE

I disclose in a rolling mill, the combination comprising at least one mill stand, a pair of work rolls rotatably mounted in said mill stand, an entry strip edge guiding mechanism disposed adjacent said work rolls and engageable with the lateral edges respectively of said strip, and a delivery strip edge guide mechanism mounted closely adjacent the delivery side of said work rolls for engaging the lateral edges respectively of said strip. My invention also contemplates similar apparatus wherein a feed reel and deflector roll are mounted in advance of said entry edge guide mechanism, and means are provided for simultaneously and transversely moving said deflector roll and said feed reel for strip alignment purposes.

The present invention relates to cold rolling mills and more particularly to an automatic threading arrangement for use in and forming part of such mill.

The use of tandem rolling mills for the production of strip has resulted in the well known problem involved in the threading strip material through the mill. For the proper operation of rolling mill, it is essential that the strip be tracked through the mill in a position of substantially parallel alignment with the center line of the mill. The problem associated with threading the mill is complicated in the case of relatively thin strip, which tends to buckle when inserted between the boards or other entry guides of subsequent mill stands.

Relatively thick strip or plate can be threaded without undue difficulty by conventional procedures as the thicker strip and plate do not tend to buckle or cobble. On the other hand, very thin strip is adaptable for automatic threading with the use of magnetic tables or the like, such as disclosed in a co-pending, co-assigned application of Paul M. Lowy entitled Automatic Threading Device for Rolling Mills, Ser. No. 520,573 filed Jan. 14, 1966 Pat. No. 3,422,649.

For strip of intermediate thickness, extreme difficulties have been encountered in threading the strip mill. While several attempts, one of which is discussed below, have been directed to automatic threading of strip mills, threading by slow and laborious manual efforts has been necessitated. As a result, the theoretical production available from a given strip mill has been seriously curtailed owing to the considerable expenditure of time in the manual threading process. These difficulties are complicated by non-uniform conditions of the strip and by the necessity of frequent roll changes and the use of rolls of differing diameters. Rolls may require changing two or three times during a working shift. Accordingly, it is essential to incorporate automatic threading means in a typical rolling mill at positions of non-interference with the roll changing operation.

Although my invention, as described below is particularly adaptable for cold strip mills handling strip of intermediate thickness, my novel automatic threading arrangement can be used to advantage for the reduction of threading time in other rolling mill applications. My invention, in particular, overcomes the problems associated with the tendency of the strip to buckle or cobble during the threading operation.

While a number of automatic threading devices for strip mills have been disclosed in the past, the most significant attempt in this category is that represented by the U.S. Pat. to Lyle 3,204,441. Lyle discloses an automatic centering device for the pay-out coil in conjunction with a belt-type centering guide between adjacent mill stands. The Lyle device and similar arrangements, however have been found to be incapable of preventing buckling of the strip as it is threaded through the mill. This follows from failure to place the Lyle devices close enough to the rolls of each mill stand to prevent buckling of the strip before it enters the guides.

I overcome these disadvantages of the prior art by providing an automatic threading or tracking device between each adjacent pair of mill stands. The automatic threading device is mounted on the mill stand housing so as to be juxtaposed to the work roll exit. The automatic threading device, moreover, is uniquely arranged with additional means for guiding the strip and for preventing buckling thereof. My novel threading device is capable of accommodating differing diameters of work rolls without interference with the roll changing operation.

Thus, my novel guiding or threading device can automatically handle the strip irrespective of the attitude in which it is delivered from the immediately preceding work rolls and to guide the strip, during the threading operation to the succeeding mill stand. The novel components of each such interstand threading device are arranged that no vertical adjustment is required although work rolls of differing diameters are encountered. In consequence, the disclosed interstand threading device provides guidance for the strip in close proximity to its exit from the preceding work rolls. As a result, the strip does not have an opportunity to buckle or cobble or otherwise misalign itself, before entering the threading mechanism.

The aforementioned interstand guiding and threading devices desirably are employed in conjunction with novel and automatic threading arrangements employed in accord with my invention for delivering strip in a proper attitude to the initial mill stand. The pay-out coils are delivered to the tandem mill by means of the usual conveyor, transfer car and elevator. A deflector roll is employed for guiding the strip between the feed reel and the initial mill stand. A deflector roll is slidably mounted for axial movement, as well as rotational movement upon its shaft. Means are provided for sliding the deflector roll with the feed reel housing.

A conventional strip edge sensing and controlling arrangement is mounted, in this example, over the feed reel, and, as the coil pays off, the edge control senses any variation in location of the strip edge from its correct lateral position. When a variation is detected, the edge control automatically shifts both the feed reel and the aforementioned deflector roll to the correct lateral position for proper threading and operation of the rolling mill.

Novel strip guidance means are located between the strip edge control and the usual entry pinch rolls. In certain applications of the invention, additional such guidance means can be utilized between these pinch rolls and novel strip straighening means for the initial mill stand. In the latter arrangement both a preliminary alignment and a final alignment are imparted to the moving strip by the guidance means in conjunction with the strip edge control for the proper lateral adjustment of the pay-out reel. The aforementioned first and second guidance means can cooperate to center the strip when it is dropped from the coil opening equipment onto the mill pass line. The guidance means remain in contact with the strip edges until the strip has been properly threaded and tensioned between the initial mill stand and the feed reel. The guidance means can then be retracted from the strip to obviate any restriction upon normal strip travel through the tandem mill.

The aforementioined straightener serves in addition as an entry guide for the initial mill stand. In one arrangement of the invention, the straightener and entry guide includes a roll leveler for removing strip curvature and strip edge guiding means for use during threading of the rolling mill. The latter edge guiding means likewise can be retracted upon completion of the threading operation.

I realize these desirable results by providing in a rolling mill, the combination comprising at least one mill stand, a pair of work rolls rotatably mounted in said mill stand, an entry strip edge guiding mechanism disposed adjacent said work rolls and engageable with the lateral edges respectively of said strip, and a delivery strip edge guide mechanism mounted closely adjacent the delivery side of said work rolls for engaging the lateral edges respectively of said strip.

I also desirably provide similar apparatus wherein a straightener is mounted between said entry guide mechanism and the entry side of an initial mill stand of said mill.

I also desirably provide similar apparatus wherein a second entry edge guide mechanism is mounted in advance of said first-mentioned enry edge guide mechanism.

I also desirably provide similar apparatus wherein a feed reel and deflector roll are mounted in advance of said entry edge guide mechanism, and means are provide for simultaneously and transversely moving said deflector roll and said feed reel for strip alignment purposes.

During the foregoing discussion, various objects features and advantages of the invention have been set forth. These and other objects, features and advantages of the invention together with structural details thereof will be elaborated upon during the forthcoming description of certain presently preferred embodiments of the invetnion and presently preferred methods of practicing the same.

In the accompanying drawings I have shown certain presently preferred embodiments of the invention and have illustrated certain presently preferred methods of practicing the same, wherein:

FIGS. 1A, 1B and 1C constitute a composite side elevational view of one form of tandem rolling mill arranged in accordance with the invention;

FIG .2 is an enlarged elevational view of the feed reel 38, deflector roll 40, and associated components some of which are shown in FIG. 1C;

Figure 1A:
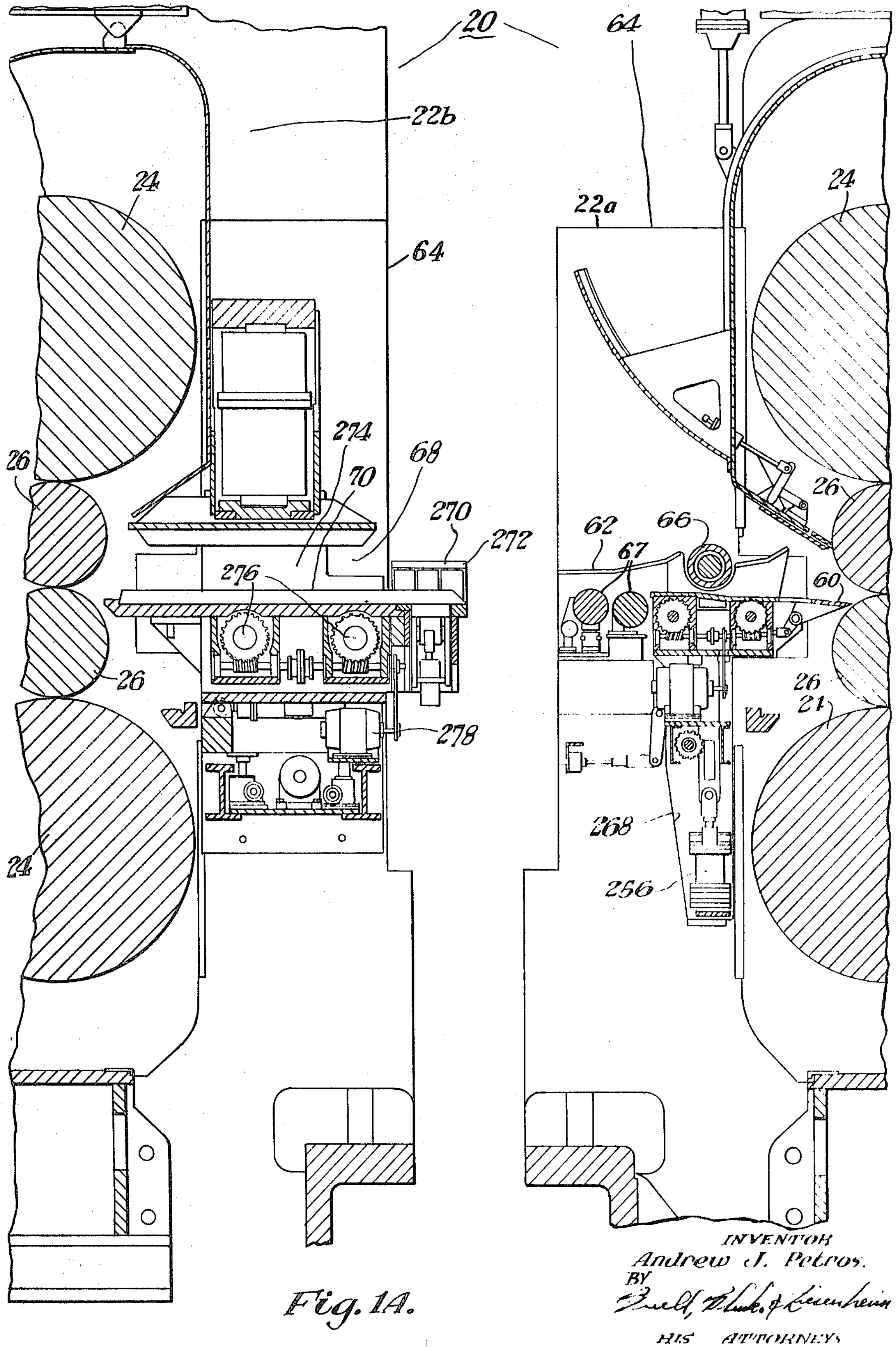
Figure 1B:
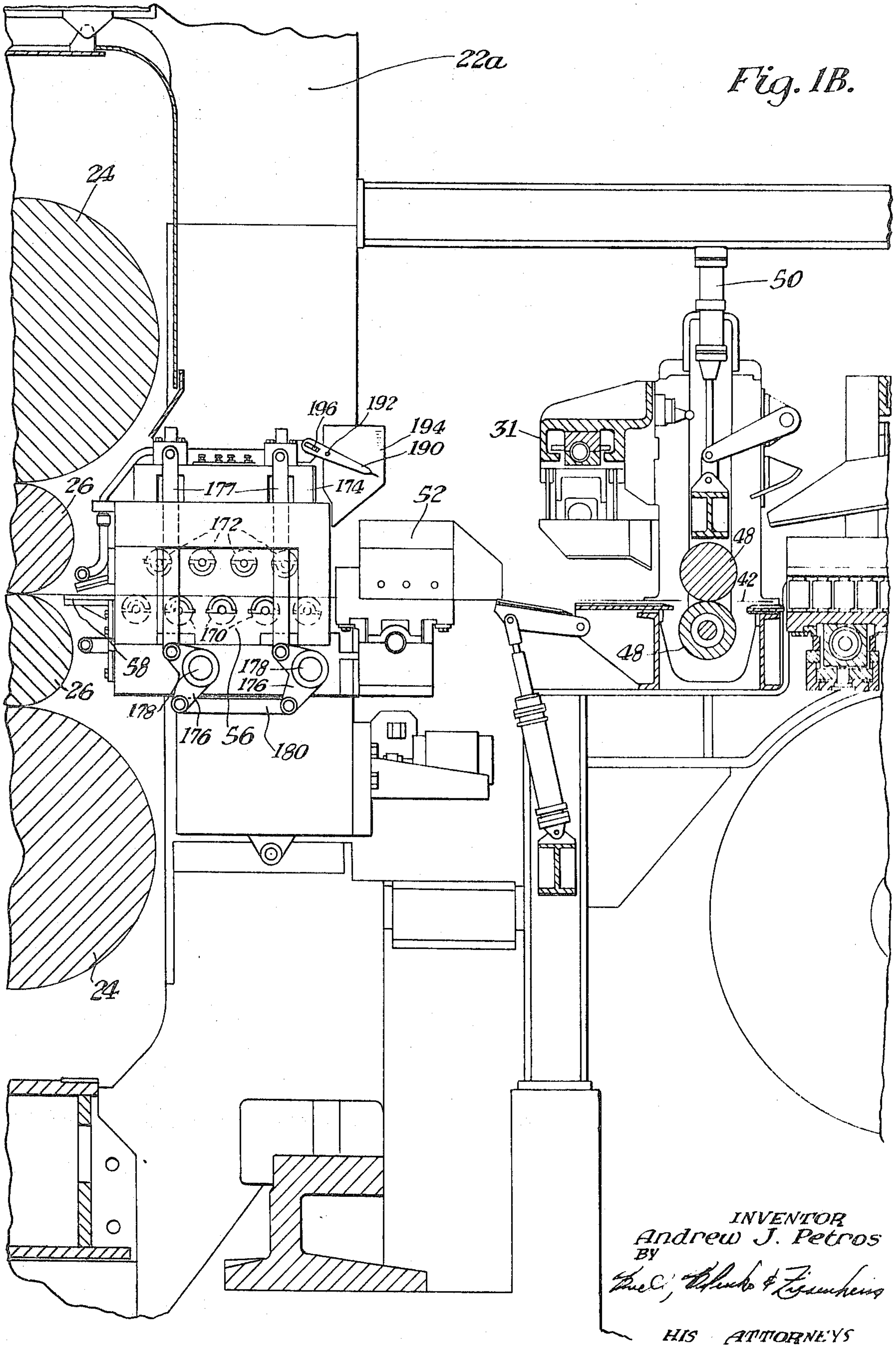
Figure 1C:
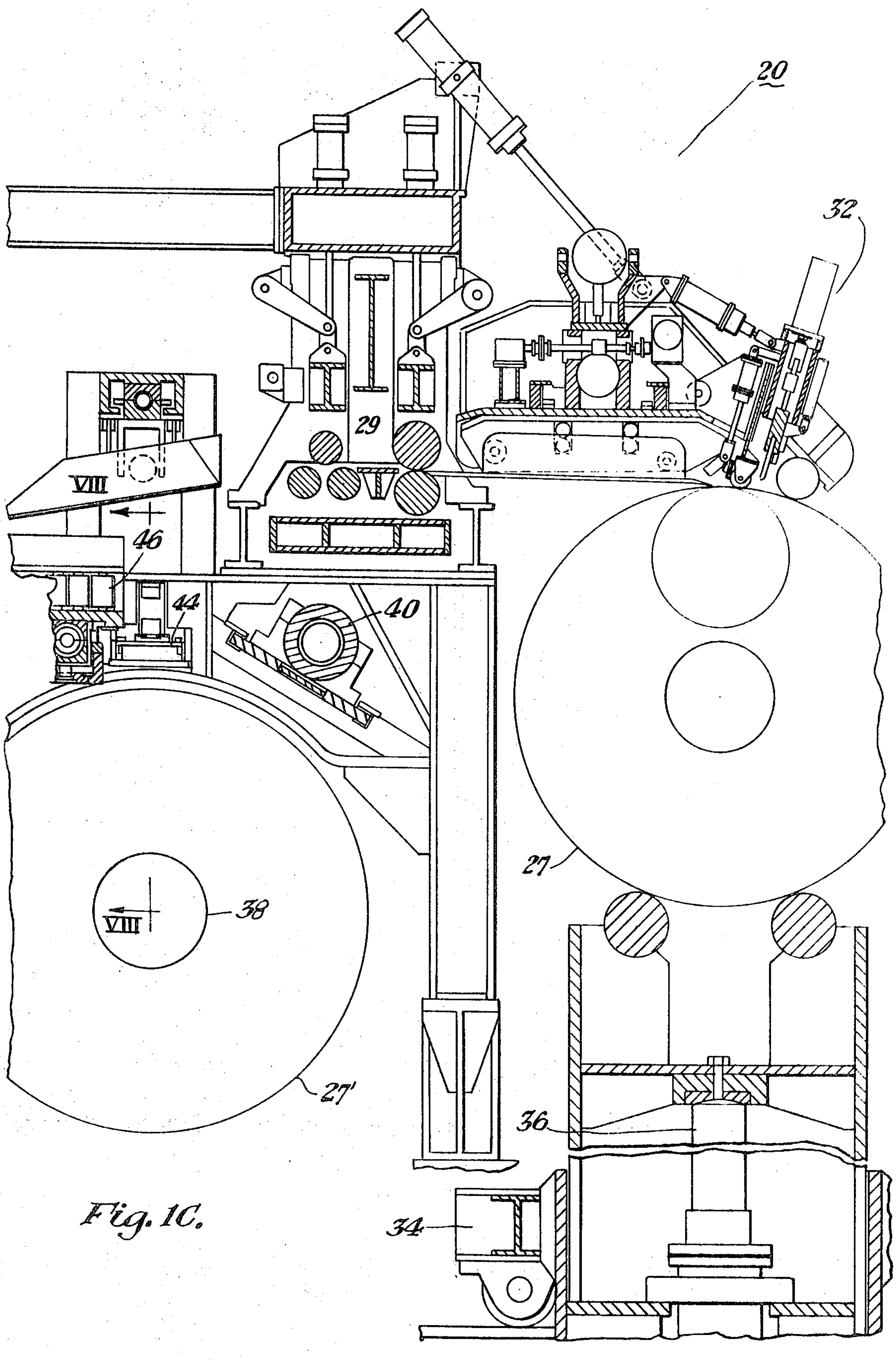

Referring now to FIGS. 1A and 1B and 1C of the drawings, the exemplary tandem rolling mill 20 of the invention as shown therein comprises a plurality of tandemly associated rolling mill stands 22, with each stand having a pair of backup rolls 24 and a pair of work rolls 26. A coil 27 of strip or the like is delivered by a conventional coil carriage means (not shown) to band removal apparatus (not shown), and thence to coil opener mechanism 32, from which the leading end of the strip is conveyed to straightener 29 and carriers 31. The coil 27 is thus held in standby condition, while the preceding coil 28, which has been transferred to its operating or running position 28' by means of coil car 34 and elevator 36, is paid out. The components described thus far are conventional in construction and the requirement for further description is obviated.

In the coil-dropped, operating position 28', the coil is supported upon feed reel 38 coupled in a novel manner to deflector roll 40. Means are provided by my invention for laterally adjusting both the feed reel 38 and the deflector roll 40 to aid in automatically threading the tandem mill 20, all of which is described in greater detail hereinafter.

From the deflector roll 40, the strip is passed along mill pass line 42 to strip edge sensing means 44 and thence to roller strip edge guide mechanism 46. The side guide mechanism 46 is likewise mounted for transverse movement relative to the tandem rolling mill 20 to aid in aligning the strip 28' with the center line of the rolling mill, or with some other frame of reference. As detailed hereinafter, the transverse movement is controlled by the lateral strip edge sensing means 44. This combinative lateral movement of the edge guide mechanism 46, deflector roll 40 and feed reel 38 furnishes a preliminary alignment of the strip relative to the balance of the tandem rolling mill 20.

From the preliminary side guide mechanism 46, the leading edge of the strip passes between pinch rolls 48, which are sperated by means of cylinder 50 after threading of the mill 20 is completed. From the pinch rolls 48, the strip is passed to a second roller side guide mechanism 52 of the same construction as that of the first side guide mechanism 46. The transverse movement of the second guide mechanism is likewise controlled, as detailed hereinafter, by the strip edge sensing means 44. The second side guide mechanism 52 thus imparts a final alignment of the strip with the center line of the mill 20, or other desired frame of reference.

Upon its exit from the second side guide mechanism 52 the strip is passed through a roll leveler generally denoted by reference character 56. The leveler 56 straightens the strip by removing the curl normally present from the previous coiling operation. Of equal importance, the leveler aids in maintaining the strip in its proper aligned attitude, from the final alignment station or guide mechanism 52 to entry boards 58 of other entry mechanism disposed at the entry side of the first mill stand 22*a*. The entry boards 58 likewise aid in maintaining the aligned condition of the strip 28'. The significant contribution of the leveler 56 and entry boards 58 in this respect, is the prevention of strip buckling or cobbling.

Upon exiting from the initial work rolls 26, the strip is passed to an adjustable stripper plate 60 likewise forming part of the invention. The stripper 60 is manipulated by novel means to compensate for varying or differing work roll diameters and to retract the table during the work roll changing operation.

From the stripper 60, the strip enters a delivery alignment mechanism 62, which is a desirable component of my automatic mill threading mechanism. The delivery alignment mechanism 62 desirably is mounted within the associated mill housing 64, as I have found through extensive experience that this location of the delivery alignment mechanism 62 is most efficacious in maintaining the continued alignment of the strip 28' as it passed from the delivery side of a preceding mill stand such as the stand 22*a* to the entry side of a succeeding mill stand such as the stand 22*b*.

The delivery alignment mechanism 62 is operated in conjunction with deflector roll 66, and these components are disposed such that the delivery alignment mechanism 62 can be operated effectively irrespective of differing work roll diameters. This is an important consideration as the work rolls 26 may be changed several times during an operating shift. The delivery alignment mechanism 62 is also capable of transverse adjustment, as described below, and such adjustment is controlled, for example, by similar strip edge sensing means (not shown) disposed adjacent the side guides 68 mentioned below. The deflector roll 66 also provides, as known, a constant entry attitude for the strip tensiometer rolls 67.

Similar delivery tables 60, delivery alignment mechanisms 62, and deflector rolls 66 desirably are associated with each of the mill housings 64, as typified by the housing 64 of the succeeding mill stand 22*b*. Desirably also each delivery alignment mechanism 62 is operated in conjunction with a third roller side guide mechanism 68 mounted on the housing 64 of an adjacent or succeeding mill stand. The side guides 68 likewise are transversely movable and are controlled by the aforementioned strip edge sensing means. From the roller side guide 68 the strip 28' is fed to a conventional entry table 70 of the succeeding mill stand, on which the guide mechanism 68 is mounted.

Figure 2:
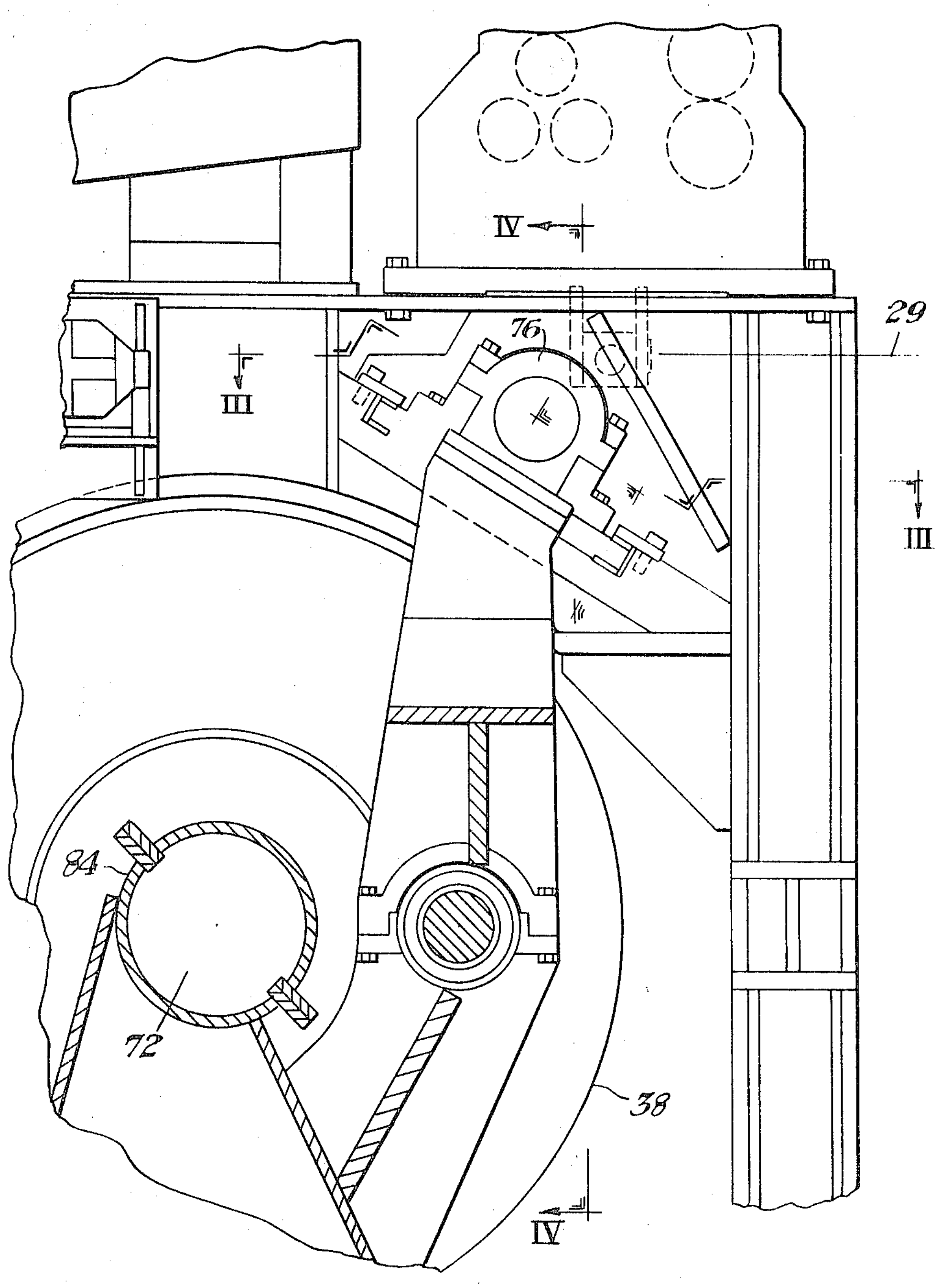
Figure 3:
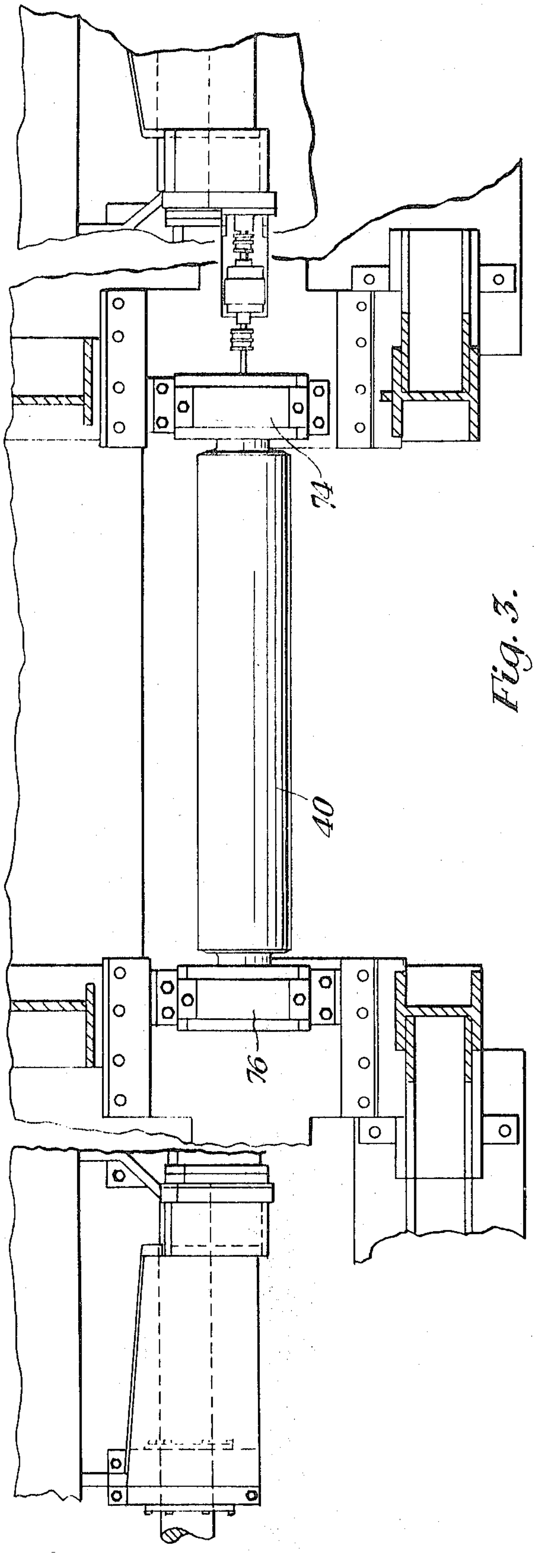
FIG. 3 is a cross sectional view of the apparatus as shown in FIG. 2 and taken along reference line IIII—III thereof.
Figure 4:
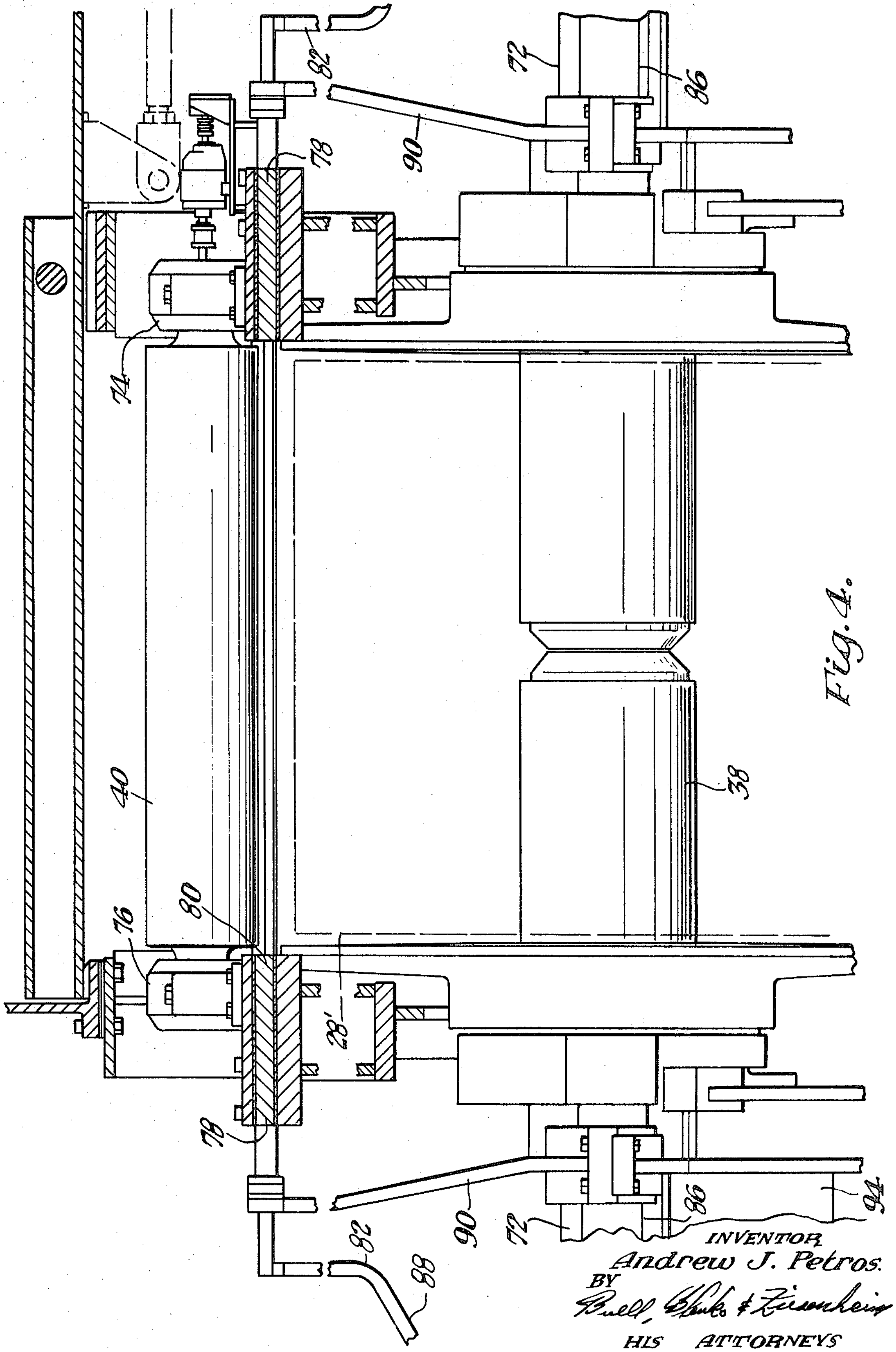
FIG. 4 is another cross sectional view of the apparatus as shown in FIG. 2 but taken along reference line IV—IV thereof.
Figure 10:
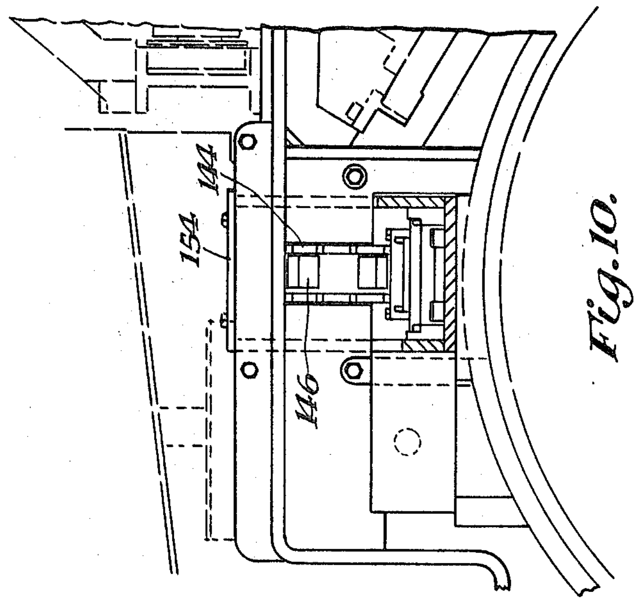
FIG. 10 is a partial cross sectional view of the apparatus as shown in FIG. 8 and taken along reference line X—X thereof.
Figure 11:
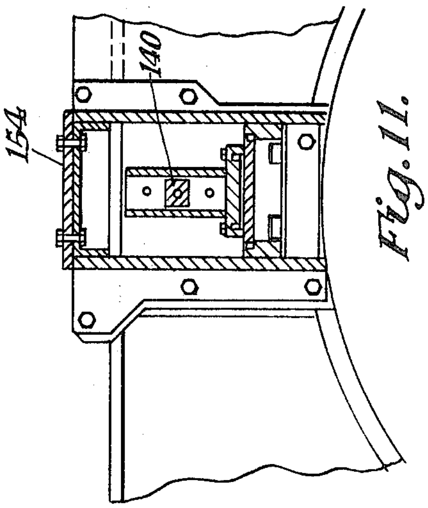
FIG. 11 is another partial cross sectional view of the apparatus as shown in FIG. 8 and taken along reference line XI—XI thereof.

Referring now to FIGS. 2–4 of the drawings, an exemplary arrangement is illustrated for laterally adjusting both the feed reel 38 and the feed deflector roll 40 in order to ensure perfect tracking of the strip 38' along the mill pass line 42. In this example, the feed reel 38 is secured to shaft 72 for rotation therewith. The shaft 72 is rotated by suitable driving means which is speed-matched with the driving means for the backup rolls 24 in a conventional manner to ensure proper payout of the strip from the coil 28'. The feed reel 38 and its drive shaft 72 can be adjusted laterally as viewed in FIG. 4 by means of a hydraulic cylinder (not shown) or the like.

On the other hand, the deflector roll 40 is mounted at one end in a fixed pillow block bearing 74 or the like and at its other end in floating bearing 76 for the purpose of allowing for expansion in the deflector roll 40. The bearings 74, 76 and hence the deflector roll 40 are mounted on slide plate 78 in order to permit transverse displacement of the roll 40. The slide plate is apertured at 80 to accommodate the face structure of the roll 40.

Secured to each end of the slide plate 78 is a reinforced arm structure 82. The arm structures, as better shown in FIG. 2, are slidably mounted at 84 upon the feed reel shaft 72. In order to stabilize each arm structure 82 against turning moments, the structure 82 is also slidably mounted upon a second, stationary shaft 86 disposed eccntrically of the feed reel 38 and its drive shaft 72. In this arrangement of the arm structure, the latter includes diverging flanges 88, 90 coupled by web plates 92, 94. The hubs 84 of the arm structures 82 closely abut the feed reel 38, which is slidably but keyingly mounted upon the drive shaft 72. Accordingly, lateral displacement of the arm structure 82 along the lengths of the shafts 72, 86 result in similar and simultaneous displacement of the feed reel 38 and the deflector roll 40. The strip issuing from the coil 28', therefore, does not have to seek its own position upon the deflector roll 40 with each lateral adjustment of the feed reel 38. This arrangement of the invention, then, affords instant transverse adjustment of the strip at the deflector roll 40 when the feed reel 38 is adjusted laterally. With the two positions of adjustment or alignment thus afforded, i.e., at the feed reel 38 and the deflector roll 40 coupled with the additional strip adjustment means presently to be described, the strip can be fed in a perfectly aligned attitude from the feed reel 38 to the entry boards 58 and work rolls 26 of the first mill stand 22*a* (FIGS. 1A and 1B).

Positioning of the feed reel 38 and deflector roll 40 is accomplished by movement of arm structure 82 under control of the strip edge detection means 44 described in detail below.

Figure 7:
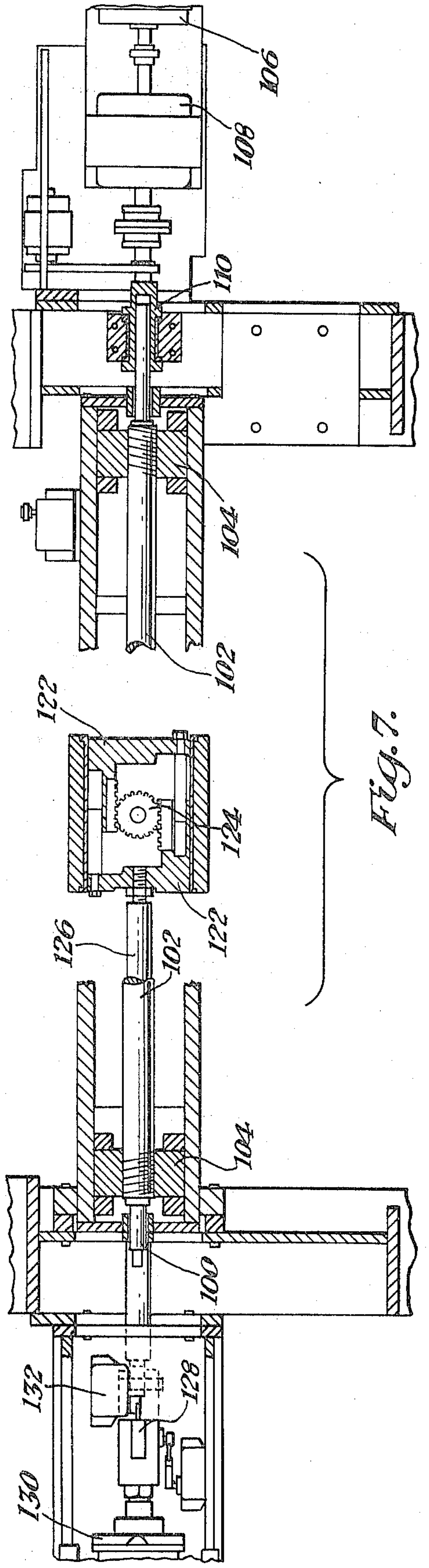
FIG. 7 is a longitudinally sectioned view of the apparatus as shown in FIG. 5 and taken along reference line VII—VII thereof.

Following the deflector roll 40 the strip is subjected to additional alignment at the aforementioned side guide mechanisms 46, 52. As these mechanisms are substantially similar, only the mechanism 46 will be described in detail in connection with FIGS. 5–7 of the drawings. In the latter arrangement of the invention, a pair of vertical side guides 96, 98 (FIG. 6) are mounted on respective screw shafts 100, 102 for movement toward and away from one another. That is, as shown in FIG. 6, between their solid outline positions and their chain-outline positions 96', 98'. For this purpose each of the side guides includes a nut 104 which threadedly engages the associated lead screw 100 or 102. The lead screws 100, 102 are driven in this example by motor 106 and gear unit 108 through a lost-motion coupling 110.

Midway between the vertical guides 96, 98 the shafts 100, 102 are jointed to a central coupling 112 in which the ends 114, 116 are slidably and rotatably supported. The coupling 112 is further arranged to impart a transverse, fine adjustment to the side guides 96, 98 (chain outlines 96'*a*, 96'*b*, 98'*a*, 98'*b*). In furtherance of this purpose, as better shown in FIGS. 6 and 7, a bracket 118 is journaled onto each of the screw shafts 100, 102 as denoted by reference character 120. Each of the brackets 118 is mounted upon a rack 122 for transverse movement therewith. Movement of the racks 122 is co-ordinated by pinion 124, which is rotated when desired by connecting one of the racks to the distal end of drive rod 126. The rod 126 is mounted for reciprocatory movement by means of pivoted link 128 and cylinder 130.

Figure 5:
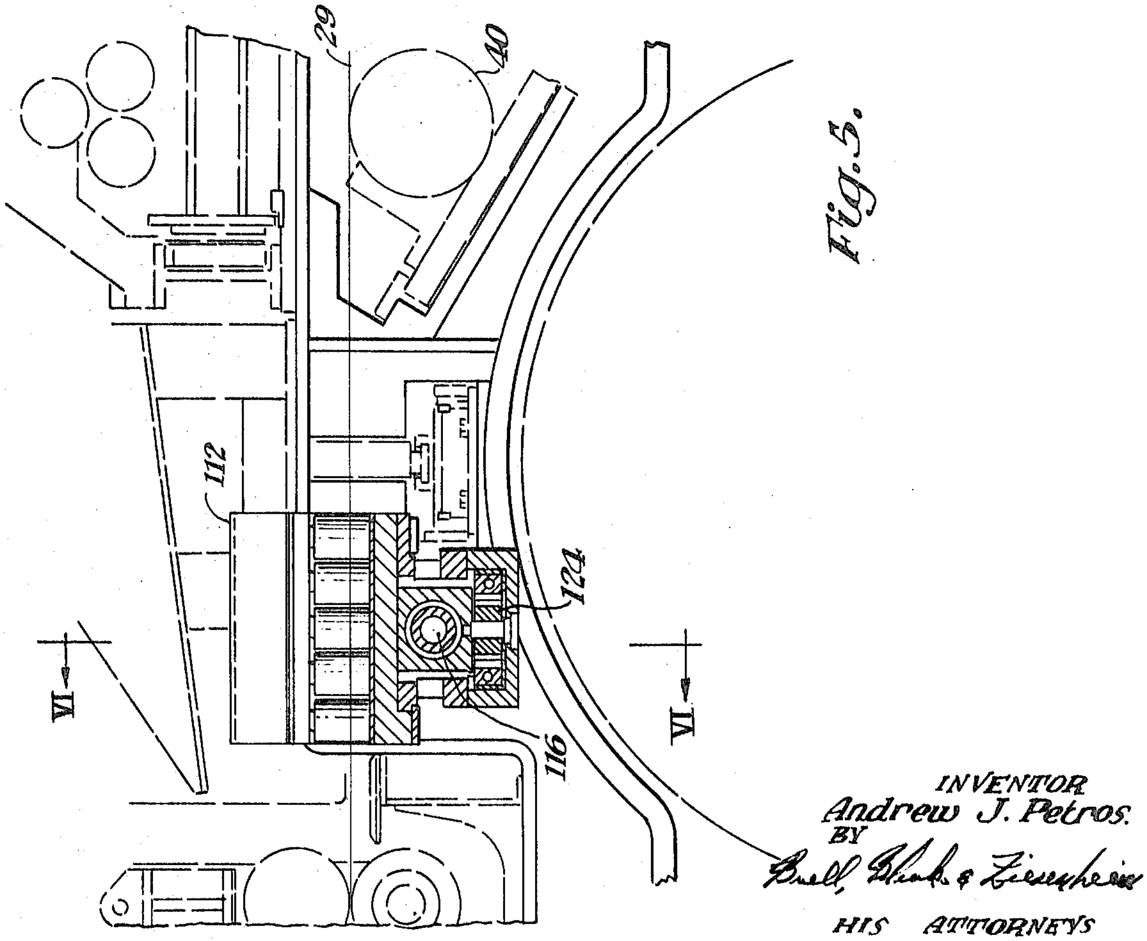
FIG. 5 is an enlarged partial sectional view of the side guide mechanism 46, deflector roll 40, and associated components as shown in FIGS. 1B and 1C of the drawings, and taken along reference line V—V of FIG. 6.
Figure 6:
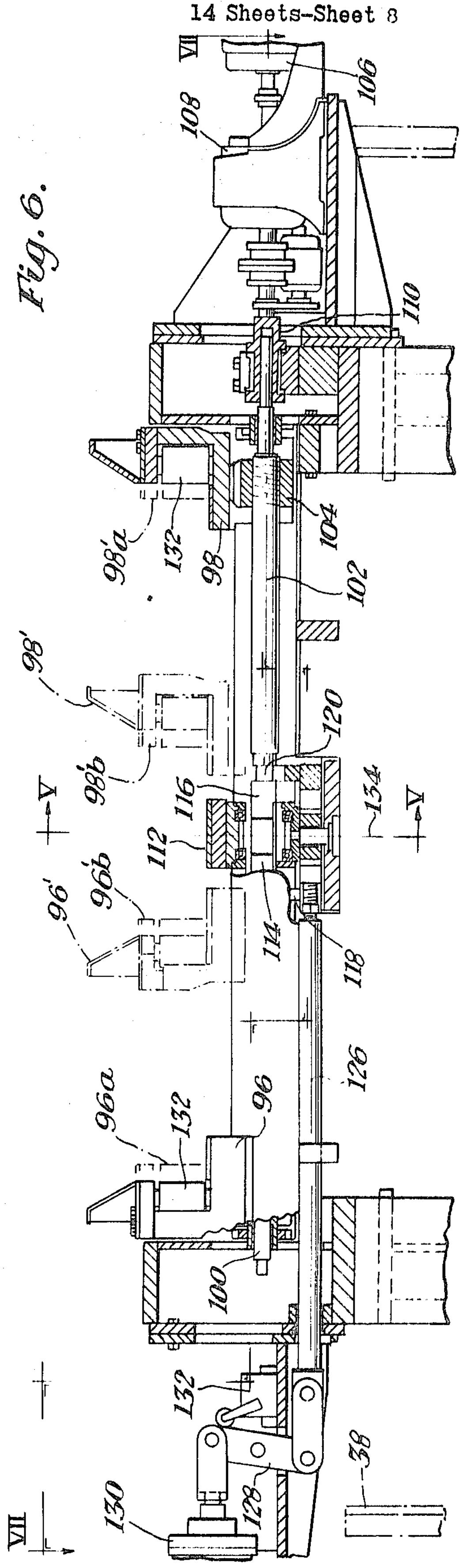
FIG. 6 is a cross sectional view of the apparatus as shown in FIG. 5 and taken along reference line VI—VI thereof.
Figure 8:
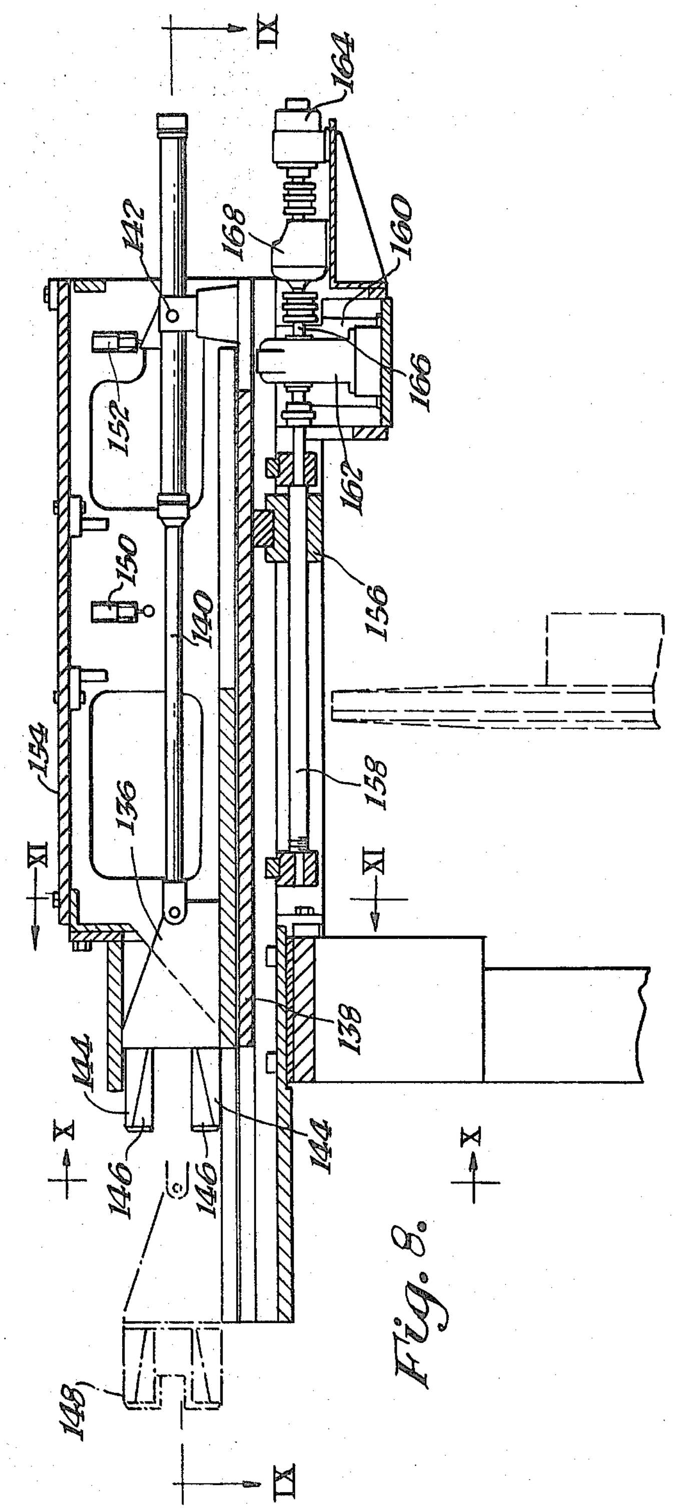
FIG. 8 is an enlarged vertically sectioned view of the apparatus as shown in FIG. 1C and taken along reference line VIII—VIII thereof.
Figure 9:
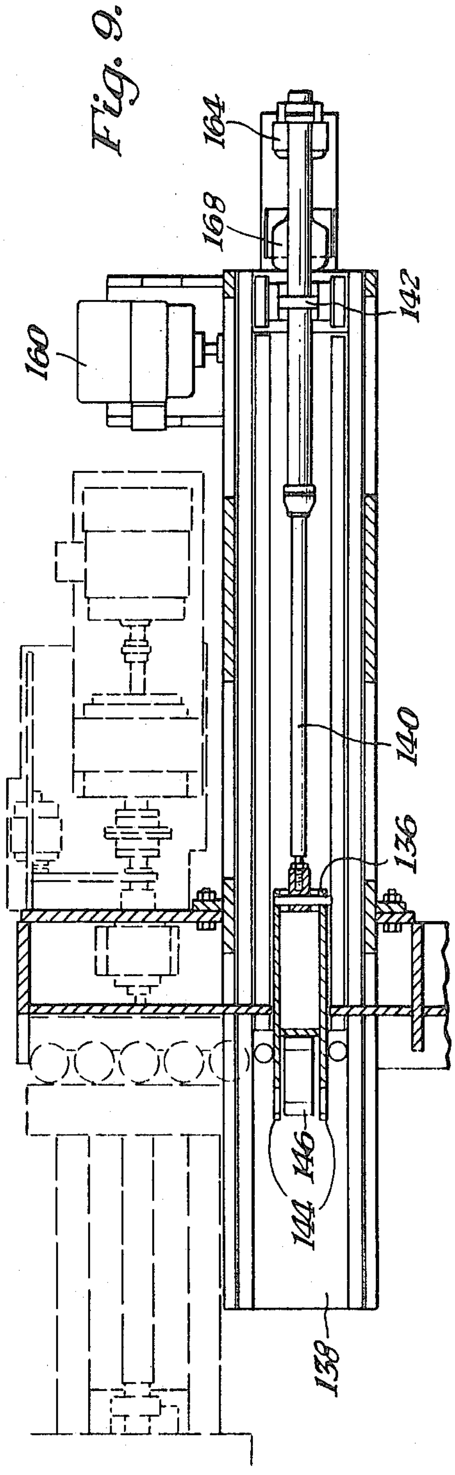
FIG. 9 is a longitudinally sectioned view of the apparatus as shown in FIG. 8 and taken along reference line X—X thereof.

Each of the side guides 96, 98 is provided in this example with a plurality of vertically disposed rollers 132, as better shown in FIG. 5 of the drawings. The rollers 132 are mounted on their respective side guides 96, 98 such that, in this example, the rollers are equidistant from center line 134 of the tandem mill. The screw shafts 100, 102 in this example are oppositely threaded with the same pitch such that the equidistant character of the side guides 96, 98 is preserved throughout their range of movement relative to the mill center line 134 to accommodate differing strip widths. The pinion 124 and racks 122 are likewise arranged for imparting equal but opposite fine adjustments to the side guides 96, 98.

With this arrangement, the side guides 96, 98 can be preset for the apporxumate strip width and position relative to the tandem mill by operation of the screw shafts 100, 102. Thereupon, the cylinder 130 can be actuated to adjust the strip center line precisely with the center line of the mill or to some other desired frame of reference. Desirably, the cylinder 130 is provided with a relatively short throw for this purpose, which is further limited by use of limit switch 132. Additional limit switches (not shown) can be disposed to determine the innermost and outermost positions respectively of the side guides 96, 98.

As in the case of the feed reel 38 and deflector roll 40, the lateral adjustment of the side guides 46 and 52 are controlled by the strip edge detection means 44 which are now to be described in greater detail with reference to FIGS. 8–11. In the arrangement of the sensing means 44 in FIG. 8, only the right half of the sensing means is illustrated. The left half is substantially identical save for reversal of parts. Each of the sensing means 44, therefore, includes a carriage 136 mounted for transverse movement relative to the tandem mill on guideways 138. The carriage can be reciprocated along the guideways 138 by means of an elongated hydraulic cylinder 140 which is pivoted to the distal end of the guideways 138 as denoted by reference character 142.

On the forward end of the carriage 136 is a supporting bracket 144 on which is mounted conventional photoelectric edge detector 146 such as that made by Reliance Company located in Cleveland, Ohio. The carriage 136 and the edge detector in this example can be manipulated between the limits represented by the solid outline of the carriage and chain outline 148 thereof. These limits represent the maximum and minimum strip widths respectively. The slide carriage positions can be delimited respectively by limit switches 150, 152 suitably mounted upon guideway housing 154.

In order to ascertain the amount of deviation of the strip edge from the edge detector 146, the latter is coupled through suitable and conventional circuitry (not shown) to lead screw motor 160. The motor 160 thus is energized when the strip edge is displaced from the detector 146 to rotate lead screw 158 through gear reducer 162. Such rotation adjusts the transverse position of the guideways 138 and detector carriage 136 by means of nut 156 which threadedly engages the lead screw 158. This operation is continued until the strip edge is again juxtaposed to the detector 146.

During the operation of the guideways 138 in the aforedescribed manner, an error signal is developed by Selsyn transmitter 164 which is coupled to a secondary output 166 of reducer 162 through a planetary reducer 168. The Selsyn transmitter 164 is of conventional construction and in this example is obtained from General Electric Company. The signal developed by the Selsyn transmitter is conducted through suitable and conventional circuitry (not shown) to the transverse drives for the feed reel 38 and deflector roll 40 and the edge guides 46, 52. This arrangement applies alignment corrections, in this example, at four locations along the length of the strip before it encounters the work rolls 26 of the initial mill stand **22*a***. In consequence, a perfect tracking or alignment of the strip with the tandem mill, in this example, the center line thereof, is assured.

Following the second edge guide mechanism 52 the leading edge of the strip enters the roll leveler 56 where the strip is straightened preparatory to entering the boards 58 or other entry guides for the initial work rolls 26. The structure of the roll leveler 56 is better shown in FIGS. 12–15 of the drawings and includes a first group of rollers 170 which are rotatably mounted at stationary locations relative to pass line 29. Thus, the lower rolls 170 are disposed in tangential relationship with the underside of the pass line 29 as viewed in FIG. 12 of the drawings.

The upper group of rolls 172, on the other hand, are mounted on vertically movable carriage 174 so that the upper rolls can be raised to facilitate threading of the tandem mill. The carriage 174 is raised and lowered by a plurality of cranks 176, with four being employed in this arrangement, the shorter arms of which are coupled by rods 178 to the carriage 174.

Figure 12:
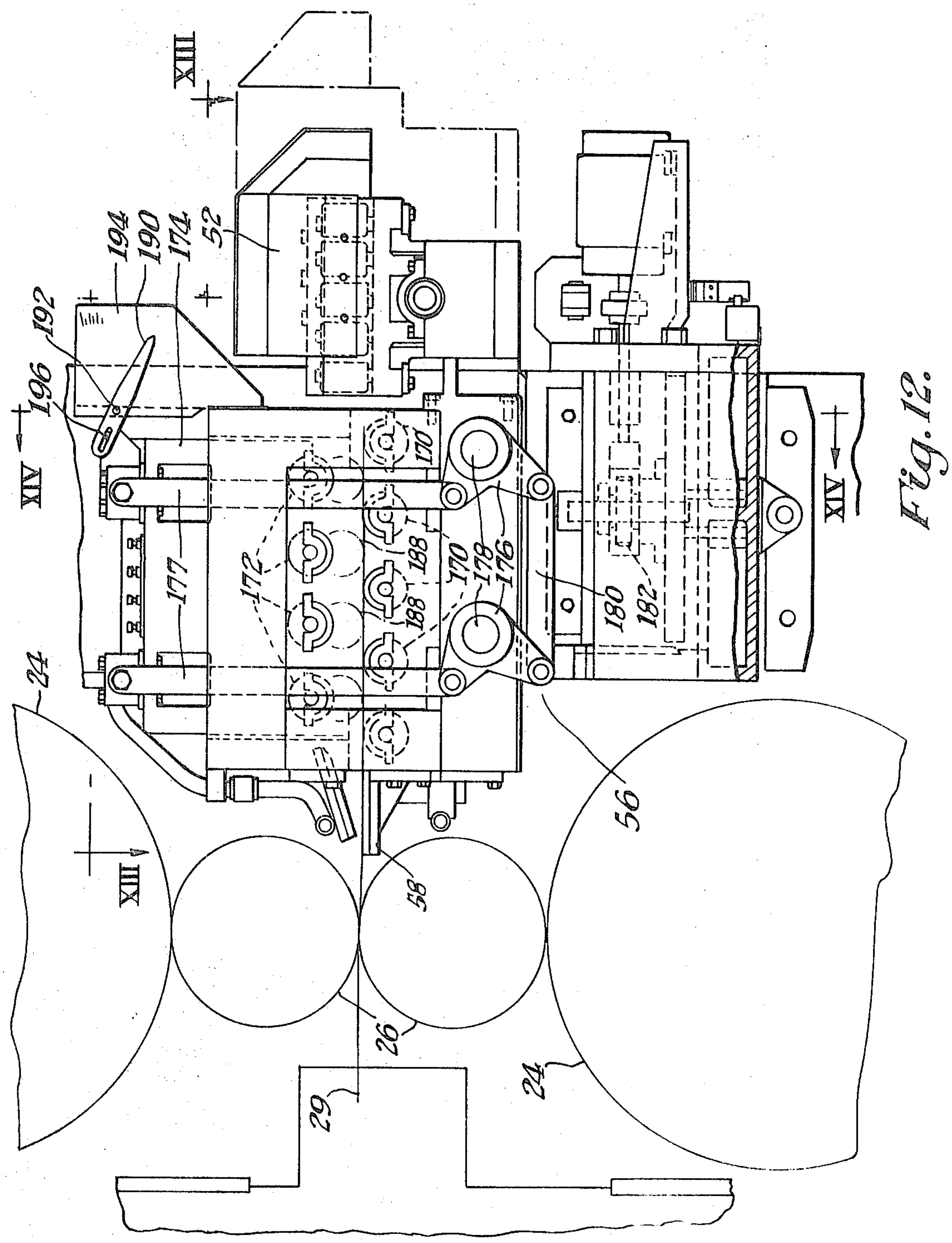
FIG. 12 is an enlarged partial elevational view of the roll leveler 56 and side guide means 52 as shown in FIG. 1B of the drawings.
Figure 13:
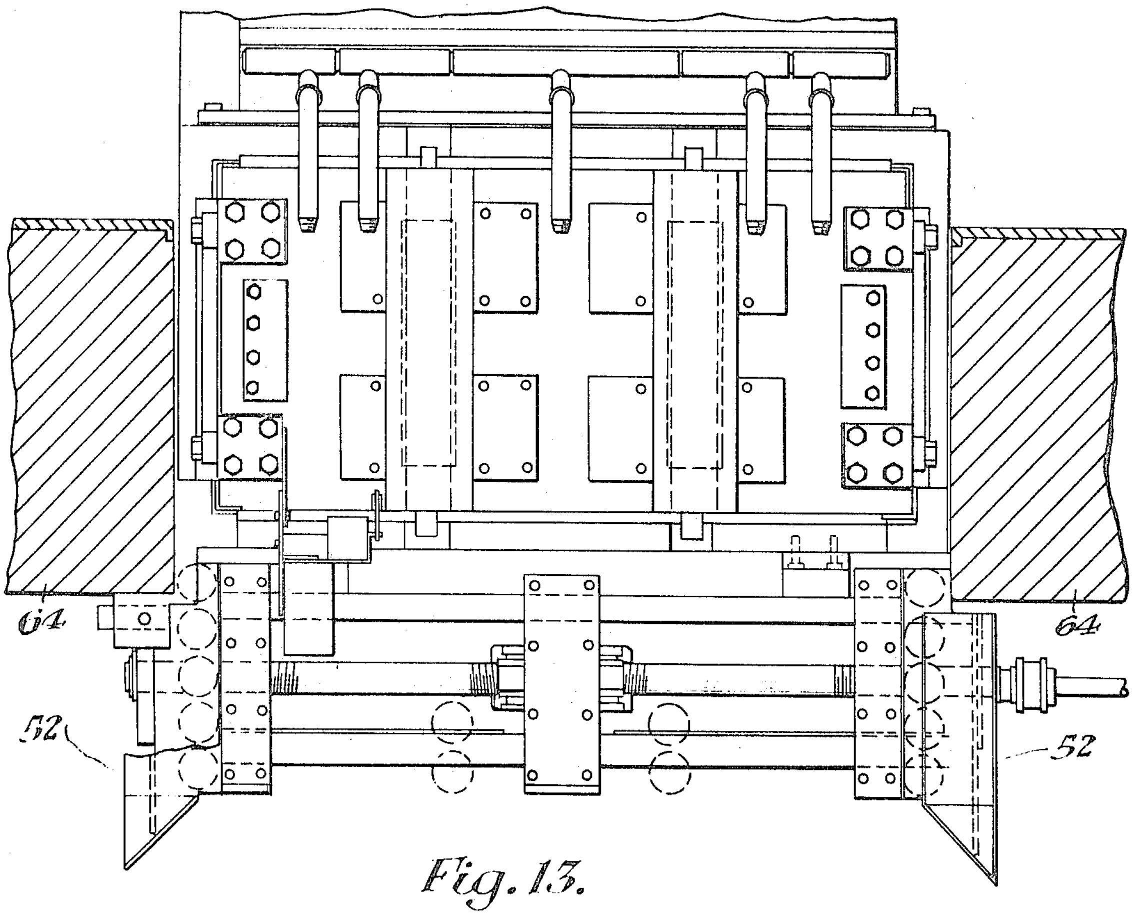
FIG. 13 is a horizontally sectioned view of the apparatus as shown in FIG. 12 and taken along reference line XIII—XIII thereof.
Figure 14:
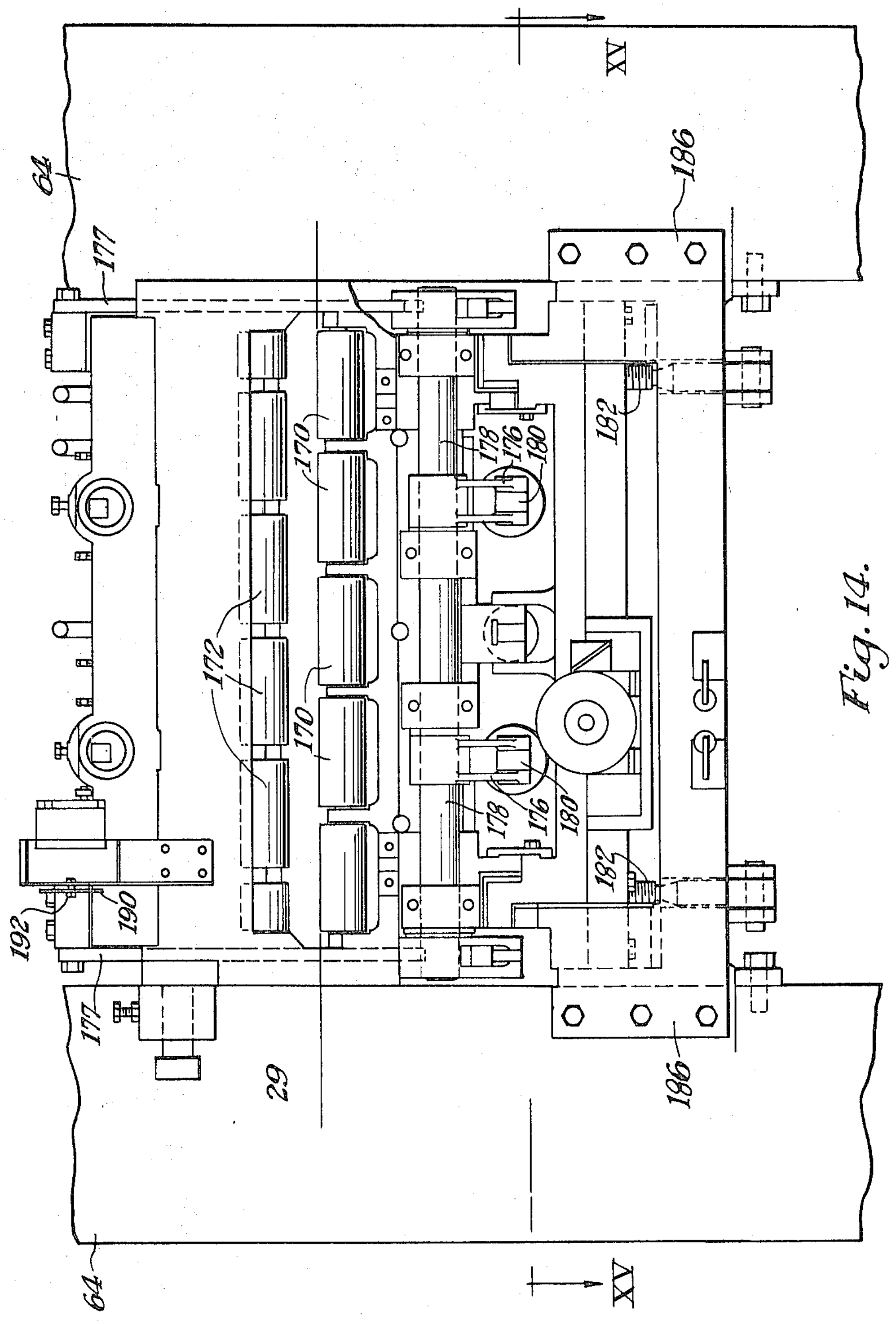
FIG. 14 is a partial vertically sectioned view of the apparatus as shown in FIG. 12 and taken along reference line XIV—XIV thereof.

The cranks 176 are paired for mounting on respective crank shafts 178 as better shown in FIGS. 12 and 14 of the drawings. The shafts 178 can be angularly displaced by means of a hydraulic cylinder (not shown) or the like. This displacement of the shafts 178 and the cranks 176 is synchronized by tie links 180.

Figure 15:
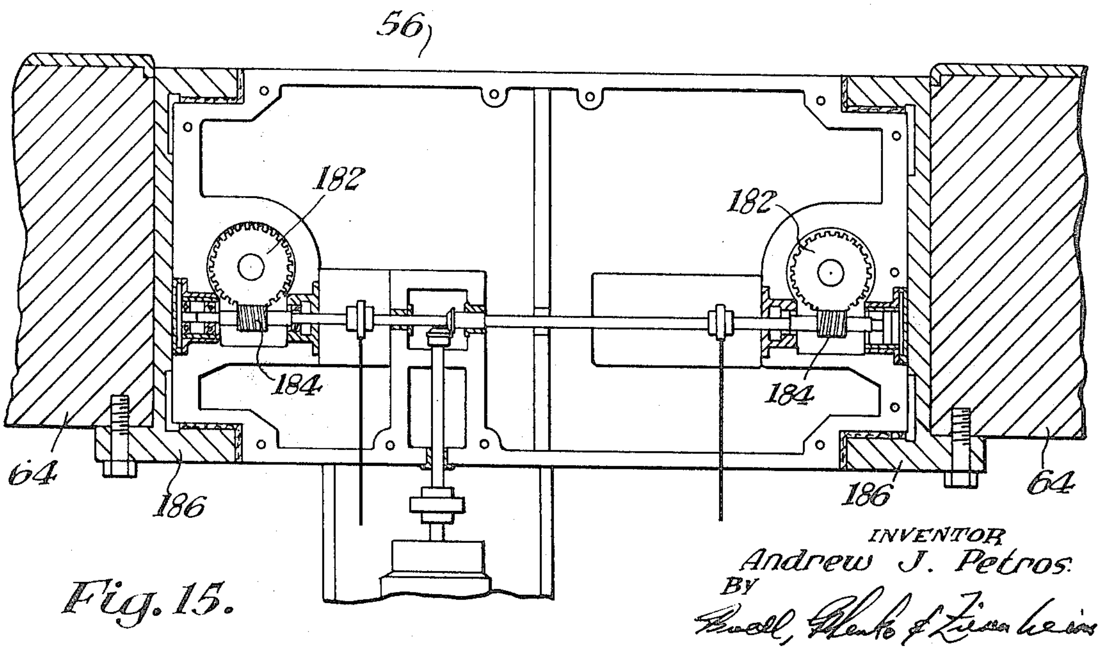
FIG. 15 is a horizontally sectional view of the apparatus as shown in FIG. 14 and taken along reference line XV—XV thereof.

As shown in FIGS. 14 and 15 of the drawings, the entire roll leveler 56 can be raised and lowered by means of jack screws 182 driven by worms 184. The vertical movement of the roll leveler 56 is confined by channel shaped guides 186 bolted or otherwise secured to the mill housing 64. The vertical adjustment accommodates the leveler 56 to a different pass line, where required.

After the leading edge of the strip reaches the work rolls 26 of the initial mill stand **22*a* the cranks 176 are manipulated to lower the upper rolls 172 to their operating positions denoted by chain outlines 188 thereof. The position of the upper rolls 172 can be indicated, if desired, by index member 190 pivoted at 192 on the roll leveler housing 194 and connected to the vertical carriage 174 by means of pin and slot arrangement 196**.

After the strip has passed through the work rolls 26, it is engaged by the stripper blade 60. Desirably, a similar blade 60 as better shown in FIGS. 1C and 1D is positioned immediately following each pair of work rolls 26. The stripper blade 60 is pivoted in a novel manner to accommodate varying work roll diameters and to permit rapid angular displacement thereof to a position where the stripper does not interfere with work roll changing.

The work rolls 26 can be changed for example in accordance with the roll changing means and methods disclosed in a co-pending, co-assigned application of Ray Wolfendale, Ser. No. 664,040, Pat. No. 3,543,556, filed Aug. 29, 1967 and in a co-pending, co-assigned application of Ray Wolfendale, Ser. No. 540,245 filed Apr. 5, 1966, Pat. No. 3,376,724.

The stripper blade 60 is provided with a dual manipulating mechanism one part of which, including hand crank 200, provides a fine adjustment for the stripper 60 between the solid outline thereof (FIG. 16) and chain outline 202. The other part of the manipulating mechanism, including lift cylinder 204 affords gross movement of the stripper from its position 60 or 202 to its corresponding raised or inactive position denoted by chain outlines 206, 208 respectively. The fine adjustment operating through pivoted link 210 and linkage 212 positions the stripper 60 in its correct attitude relative to a maximum diameter work roll **26*a* and the minimum diameter work roll 26′*a*. The lift cylinder 204 is connected between the pivoted link 210 and the link 212 to impart an extended range of movement to the latter during the lifting operation. When the cylinder is not actuated it serves merely as a stationary connection between the pivoted link 210 and the link 212. With this arrangement the stripper 60 is lifted farther (chain outline 206) when adjusted by the hand crank mechanism 200 for use with larger diameter work rolls such as the rolls 26*a***.

The delivery guide means 62, which also desirably forms part of my adjustable, automatic threading mechanism, is associated in this example with the deflector roll 66. The deflector roll 66 which is also known as a damming roll, as it prevents lubricant from being carried with the strip and downstream of the deflector roll, provides a constant approach angle upon the tensiometer rolls 214 so that the latter can deliver a constant tension irrespective of work roll diameter.

Figure 17:
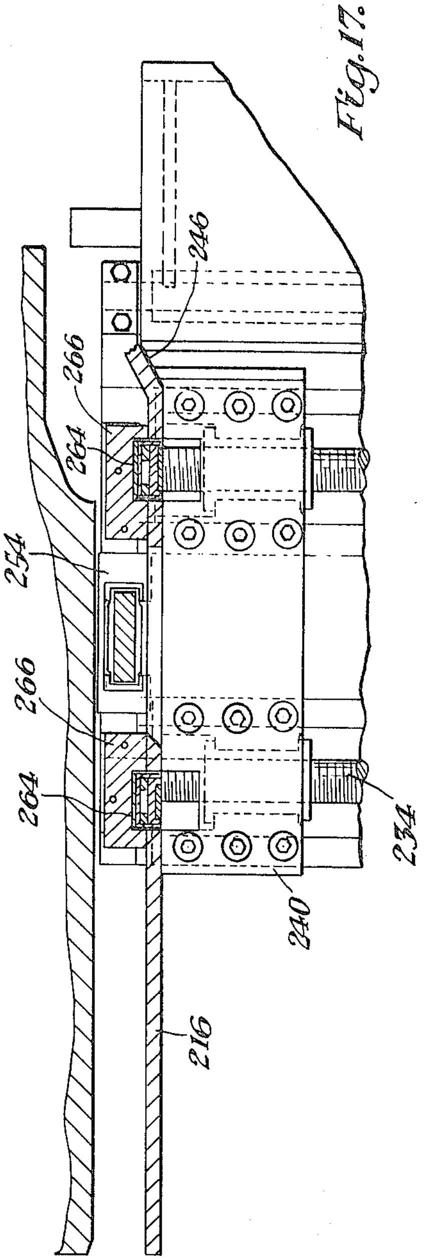
FIG. 17 is a longitudinally sectioned view of the apparatus as shown in FIG. 16 and taken along reference line XVII—XVII thereof.
Figure 16:
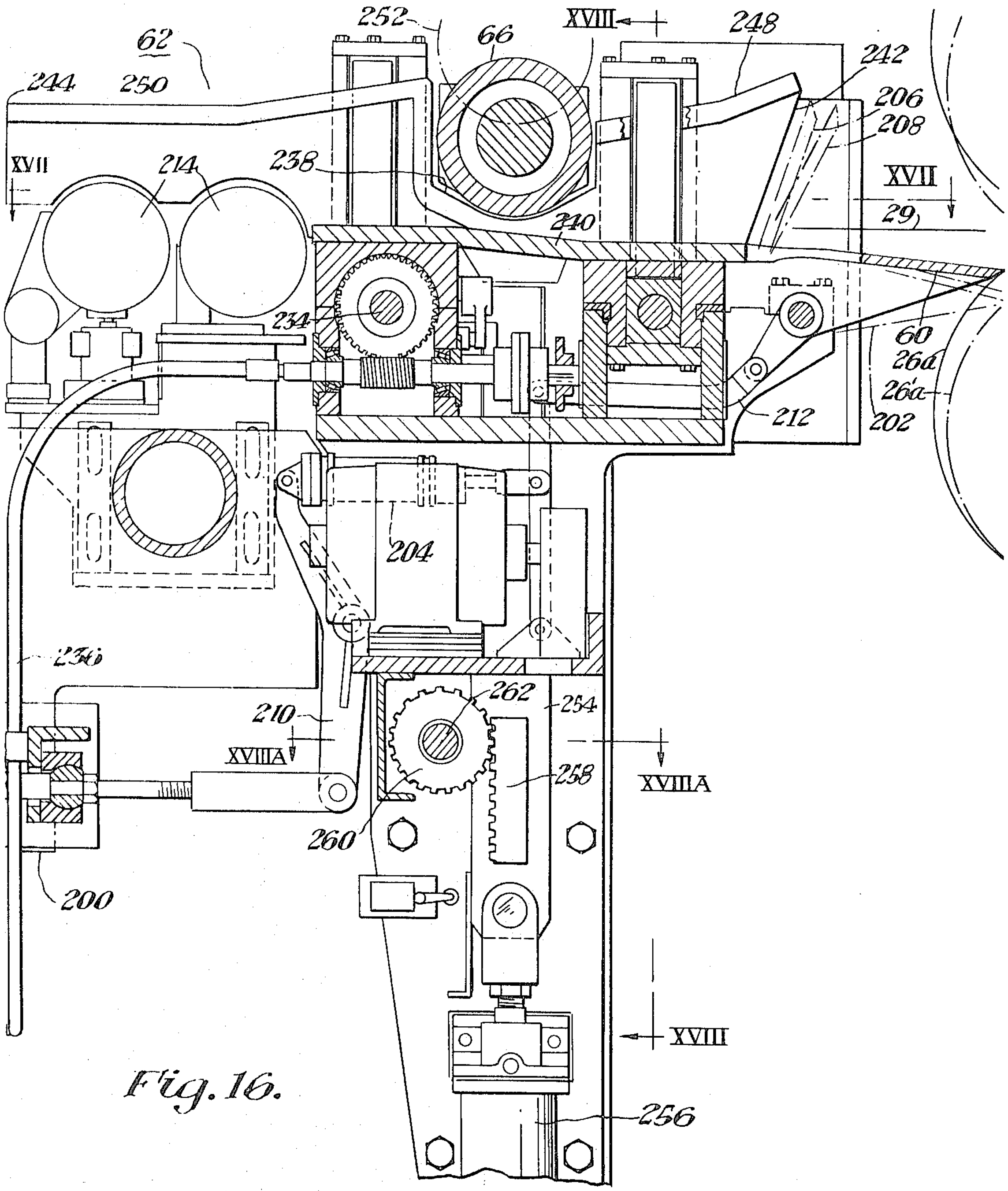
FIG. 16 is a partial enlarged, longitudinally sectioned view of the delivery alignment mechanism 62 and table 68 shown in FIG. 1A of the drawings.
Figure 18:
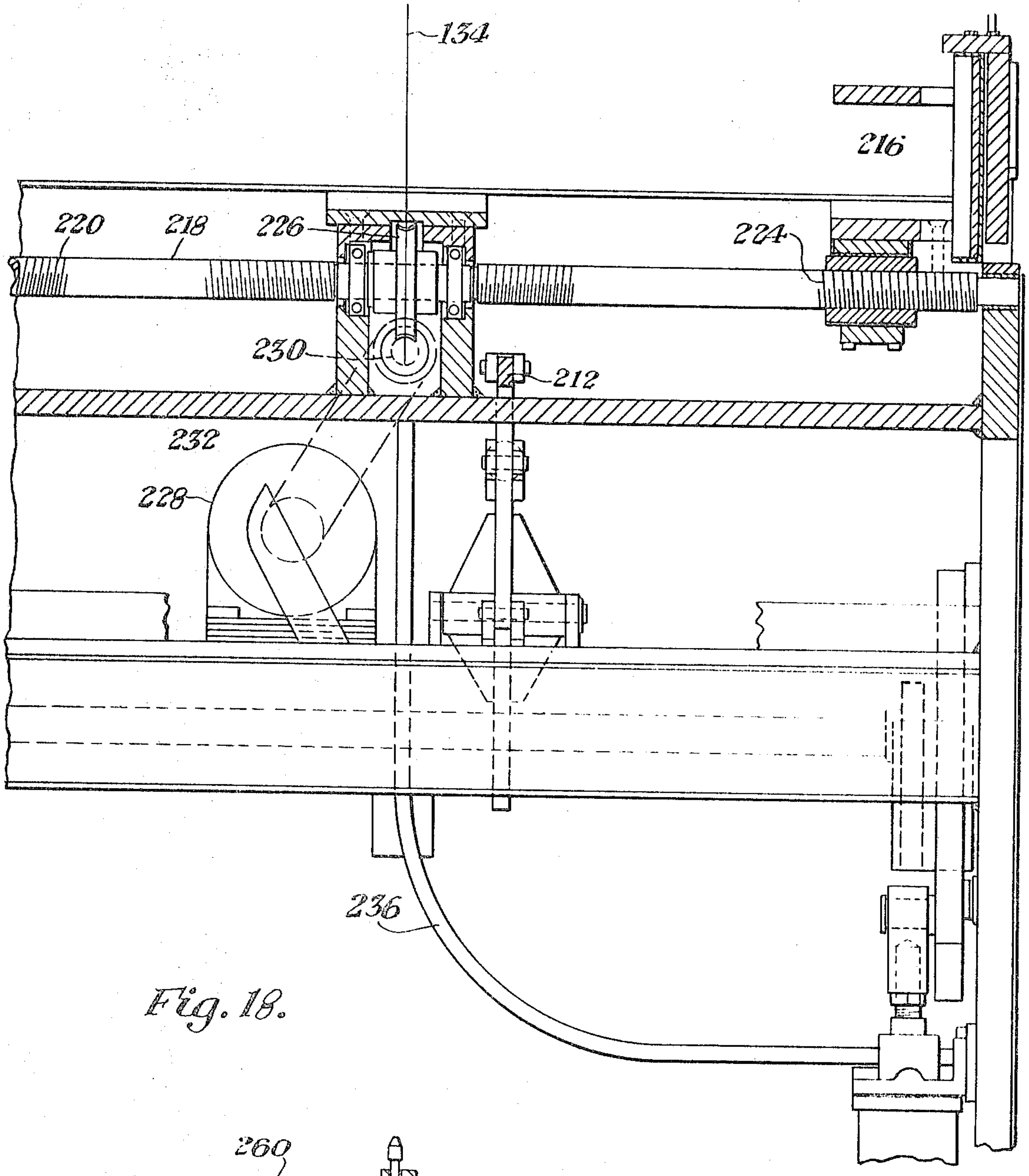
FIG. 18 is a vertically sectioned view of the apparatus as shown in FIG. 16 and taken along reference line XVIII—XVIII thereof.

The delivery side guide mechanism 62 includes in this example a pair of adjustably mounted side members, one of which is denoted at 216 in FIGS. 16 and 17. As better shown in FIG. 18 the side guides are moved toward and away from one another by means of a pair of lead screws 218 having oppositely threaded portions 220, 224 and driven by worm gear 226 centrally located thereon. Suitable drive mechanism such as electric motor 228 is provided for driving worm 230 through suitable transmission 232. As better shown in FIG. 16 worm gear shaft 234 can be coupled to a read out mechanism or the like by means of flexible shaft 236, for the purpose of indicating the distance or separation between the guides 216.

Each of the strip guides 216 is provided with a deeply notched section 238 for passage between the deflector roll face and delivery table 240. The edge guides 216 are otherwise shaped for substantially continuous engagement with the strip edges for that portion of the strip between the ends 242, 244 of the edge guides. This results from the disposition of the deflector roll face closely within notches 238 of the side guides 216.

Each of the side guides desirably is provided with a beveled front end portion 246 to deflect the strip slightly when necessary, so that the strip is aligned perfectly with the side guides 216. The upper edges of the side guides are provided with inwardly extending flanges 248, 250 to prevent the strip from buckling or cobbling.

Figure 18A:
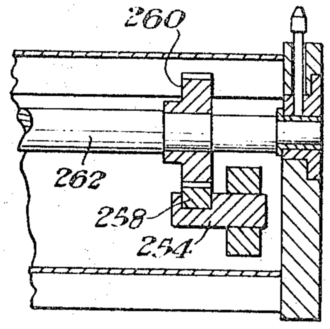
FIG. 18A is a partial horizontally sectioned view of the apparatus as shown in FIG. 16 and taken along reference line XVIII-A—XVIII-A thereof.

During threading of the tandem mill 20 the deflector roll 66 is raised to its chain outline position 252 by means of a link member 254 engaging each end of the roll 66. The link members 254 are actuated by a pair of cylinders one of which is denoted at 256. In order to equalize the lifting motions of the links 254, a rack 258 is secured to each of the lifting links 254 and disposed for engagement with a pair of pinions, one of which is denoted at 260, rigidly secured to a common shaft 262, as better shown in FIG. 18A, for rotation therewith.

In the operation of the delivery guide mechanism 62 the side guides 16, which in this example are maintained equidistantly from the center line 134 (FIG. 18) of the tandem mill 20, are set accurately to the intended strip width by energizing motor 228. Fine corrections in this setting can be made with the use of shins 264 positions when necessary between the edge guides 216 and their support brackets 266, as better shown in FIG. 17. Once the delivery guide mechanism 62 is set for a particular width of strip, it does not thereafter require readjustment owing to the close disposition of the guide mechanism to the delivery side of the work rolls 26.

As better shown in FIGS. 1C and 1D of the drawings, a similar delivery guide mechanism 62 desirably is placed in a similar position adjacent the delivery side of each pair of work rolls 26. The close disposition of the delivery guide mechanism 62 is made possible by mounting the mechanism 62 entirely within the mill stand housing 64 as noted previously. In furtherance of this purpose, the housing 64 is provided with an exit window 268 which is shaped to receive the delivery guide mechanism 62 and particularly the deflector roll lift cylinders 256 and the associated components.

As noted above alignment of the strip with the mill center line 134 or other frame of reference is assured, after the strip leaves the delivery guide mechanism 62 by means of the entry strip guide means 68 mentioned previously. The entry guide means 68 is secured to the housing 64 of the succeeding mill stand as better shown in FIGS. 1C and 1D of the drawings. In this example, the entry guide means 62 include two groups of opposed vertical rollers 270 juxtaposed to the pass line 29. Each group of rollers 270 is rotatably mounted on a support 272 which is movable transversely of the tandem mill 20 and in conjunction with suitable entry boards 274 by means of lead screws 276 driven by motor 278. In order to afford the closest possible spacing between adjacent mill stands 22 the entry edge guide 68 is likewise mounted substantially within the mill stand housing 64.

In my novel automatic threading device, the strip is provided with at least one edge guide mechanism immediately before its entry into the mill stand housing and immediately after its exit from the stripper on the delivery side of the work rolls of such mill stand. Alternatively or in conjunction therewith, an additional edge guide mechanism can be provided between the entry guide and the feed reel. In the case of the initial mill stand, a roll leveler or straightener is mounted between the work rolls and the adjacent edge guide mechanism. In succeeding mill stands, an entry edge guide mechanism can be mounted at least partially within the mill stand housing and closely spaced to the entry side of the work rolls.

From the foregoing it will be apparent that novel and efficient forms of automatic threading devices for cold mills have been described herein. While I have shown and described certain presently preferred embodiments of the invention and have illustrated presently preferred methods of practicing the same, it is to be distinctly understood that the invention is not limited thereto but may be otherwise variously embodied and practiced within the scope of the following claims.

I claim:

1. In a rolling mill, the combination comprising at least one mill stand, a housing for said mill stand, a pair of work rolls rotatably mounted in said housing, an entry strip edge guiding mechanism mounted substantially within and entirely on said housing, said entry mechanism being disposed adjacent said work rolls and engageable with the lateral edges respectively of said strip, and a delivery strip edge guiding mechanism mounted substantially within and entirely on said housing, said delivery mechanism being disposed closely adjacent the delivery side of said work rolls and engageable with the lateral edges respectively of said strip.

2. In a rolling mill, the combination comprising at least one mill stand, a housing for said mill stand, a pair of work rolls rotatably mounted in said housing, an entry strip edge guiding mechanism mounted substantially within said housing disposed adjacent said work rolls and engageable with the lateral edges respectively of said strip, and a delivery strip edge guide mechanism mounted substantially within said housing and disposed closely adjacent the delivery side of said work rolls for engaging the lateral edges respectively of said strip, said delivery edge guide mechanism being mounted adjacent a deflector roll, said delivery mechanism including a pair of strip edge guide members mounted for movement toward and away from one another, said guide members being deeply notched for passage under said deflector roll.

3. The combination according to claim 1 wherein an entry strip edge guide mechanism is mounted on a housing of a succeeding mill stand for cooperation with said delivery guide mechanism.

4. The combination according to claim 1 including an additional mill stand, and a straightener mounted between an entry guide mechanism for said additional stand and the entry side of the work rolls thereof, said additional mill stand being mounted upstream of said one mill stand.

5. In a rolling mill, the combination comprising at least one mill stand, a housing for said mill stand, a pair of work rolls rotatably mounted in said housing, an entry strip edge guiding mechanism mounted substantially within said housing disposed adjacent said work rolls and engageable with the lateral edges respectively of said strip, and a delivery strip edge guide mechanism mounted substantially within said housing and disposed closely adjacent the delivery side of said work rolls for engaging the lateral edges respectively of said strip, an additional mill stand, and a straightener mounted between an entry guide mechanism for said additional stand and the entry side of the work rolls thereof, said additional mill stand being mounted upstream of said one mill stand, said straightener being mounted in a window therefor formed in a housing for said additional mill stand.

6. In a rolling mill, the combination comprising at least one mill stand, a housing for said mill stand, a pair of work rolls rotatably mounted in said housing, an entry strip edge guiding mechanism mounted substantially within said housing disposed adjacent said work rolls and engageable with the lateral edges respectively of said strip, and a delivery strip edge guide mechanism mounted substantially within said housing and disposed closely adjacent the delivery side of said work rolls for engaging the lateral edges respectively of said strip, an additional mill stand, and a straightener mounted between an entry guide mechanism for said additional stand and the entry side of the work rolls thereof, said additional mill stand being mounted upstream of said one mill stand, a feed reel and deflector roll mounted in advance of said straightener, and alignment means for simultaneously and transversely moving said deflector roll and said feed reel for strip alignment purposes.

7. The combination according to claim 6 wherein control means are provided for said alignment means, said control means including at least one strip edge detector means for delevoping an error signal depending upon the extent of misalignment of said strip, and electromechanical means for coupling said error signal means to said alignment means.

8. The combination according to claim 1 wherein said delivery edge guide means includes a pivoted stripper plate juxtaposed to said work rolls and extended toward the bite area thereof.

9. In a rolling mill, the combination comprising at least one mill stand, a housing for said mill stand, a pair of work rolls rotatably mounted in said housing, an entry strip edge guiding mechanism mounted substantially within said housing disposed adjacent said work rolls and engageable with the lateral edges respectively of said strip, and a delivery strip edge guide mechanism mounted substantially within said housing and disposed closely adjacent the delivery side of said work rolls for engaging the lateral edges respectively of said strip, said delivery edge guide means including a pivoted stripper plate juxtaposed to said work rolls and extended toward the bite area thereof, means for adjustably pivoting said stripper plate to accommodate varying work roll diameters, said adjustment means including an expandable link mechanism for pivoting said stripper plate away from said work rolls during work roll changing irrespective of the adjusted position of said stripper plate.

References Cited

UNITED STATES PATENTS

| | | | |
|---|---|---|---|
| 1,956,636 | 5/1934 | Biggert | 72—250 |
| 3,204,441 | 9/1965 | Lyle | 72—227 X |
| 3,081,813 | 3/1963 | Anderson | 72—250 |
| 3,132,546 | 5/1964 | Barr | 72—227 |

CHARLES W. LANHAM, Primary Examiner

R. M. ROGERS, Assistant Examiner

U.S. Cl. X.R.

72—250, 420, 227